June 28, 1966  F. L. MALAY  3,258,403
NUCLEAR REACTOR CONTAINMENT SYSTEM
Filed May 24, 1963  2 Sheets-Sheet 1
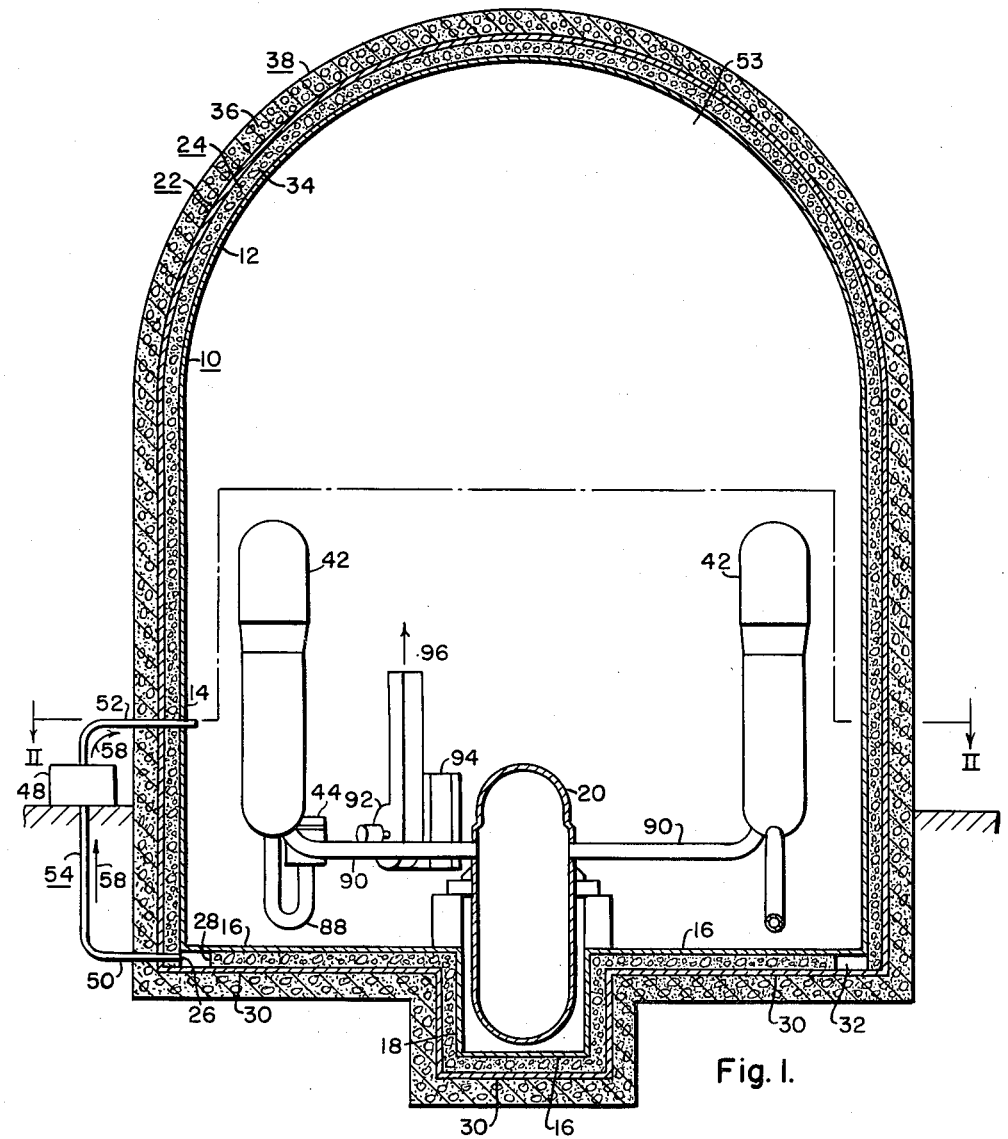
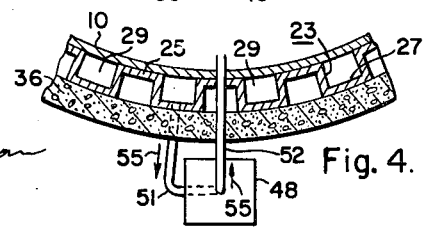
Fig. I.
Fig. 4.
WITNESSES:
INVENTOR
Frank L. Malay
BY
ATTORNEY June 28, 1966  F. L. MALAY  3,258,403
NUCLEAR REACTOR CONTAINMENT SYSTEM
Filed May 24, 1963  2 Sheets-Sheet 2

United States Patent Office 3,258,403
Patented June 28, 1966

3,258,403
NUCLEAR REACTOR CONTAINMENT SYSTEM
Frank L. Malay, Pittsburgh, Pa., assignor to Westinghouse Electric Corporation, East Pittsburgh, Pa., a corporation of Pennsylvania
Filed May 24, 1963, Ser. No. 283,057
2 Claims. (Cl. 176—37)

This invention relates in general to leakage prevention from a container containing or capable of containing fluid under pressure and more particularly to zero leakage from a nuclear plant vapor container following an accident within the nuclear container involving a nuclear core meltdown or as a result of a reactor accident.

Along with the nuclear accident a rupture in the reactor system, which is contained in a nuclear reactor container and which uses a high pressure, high temperature coolant and/or moderator such as water, can pressurize the reactor container by the sudden generation of steam produced by the flashing of the pressurized reactor water or other coolant liquid leaking into the reactor container from the pressurized water system.

Present day design practice requires that the primary or reactor portion of a plant be contained within a sealed container to prevent the escape of radioactive materials or volatile fission products to the atmosphere in case of a nuclear accident, such as a core meltdown or rupture in the reactor primary coolant system of the plant. Since no plant container can be made absolutely leak-tight, at the present technological status of the art, there is always the possibility that fission products will leak into the atmosphere and be inhaled by people outside of the plant container with the result that serious injury and even death may occur to the aforementioned people. To overcome the aforementioned danger one or a combination of the following methods are incorporated into the design or safety procedures of the present day nuclear plants:

(1) The entire reactor plant is buried underground;
(2) The civilian population in the vicinity of the nuclear plant is evacuated following a nuclear incident; and
(3) The nuclear plant is located a sufficiently large distance away from any population center. However, the aforementioned methods are undesirable, because they result in excessive costs, including capital costs and/or electrical transmission costs. Therefore, a method of preventing leakage from a vapor container results in greater safety, more flexibility in plant location, and possibly substantial savings in plant costs.

Accordingly, it is the general object of this invention to prevent leakage from a container containing or capable of containing pressurized fluid.

It is a more particular object of this invention to provide a novel arrangement of preventing leakage to the atmosphere from a nuclear plant vapor container.

Another object of this invention is to prevent leakage to the exterior of an enclosure of the double containment type.

Still another object of this invention is to provide means within a container for reducing the temperature and pressure of a fluid within the container.

Briefly, the present invention accomplishes the above-cited objects by providing an inner container which encloses the primary coolant system including the reactor, the heat exchangers, the primary coolant pumps, the interconnecting piping and auxiliary piping which handles or may handle primary coolant. An outer container then surrounds and is spaced from the inner container so as to form a space between the two aforementioned containers. Therefore, the reactor plant enclosure comprises two sealed liners or containers, one within the other which are structurally separated by a means which permits the flow of fluid through the space between the two liners. The space between the two containers is maintained at a pressure below both the internal pressure of the inner container and the pressure outside of the outer container, for example atmospheric pressure. All leakage into the space enclosed by the two containers is pumped into the inner container. In addition, a thick reinforced concrete structure around the outer container provides the strength to contain the pressure buildup which can result from a serious accident to the reactor plant arising from a primary coolant system rupture. The concrete structure also serves as a shield against the direct radiation sources within the inner container.

In case of an accident in which the primary coolant system ruptures within the inner container, the high pressure, high temperature fluid and possibly fission products from the reactor system escape into the inner container. The escaping fluid flashes into vapor, in the case of a liquid coolant, or otherwise expands and fills and pressurizes the inner container. Any leakage from the inner container would then flow into the space between the two containers. The aforementioned leakage is then pumped back into the inner container by such means as a compressor. This pumping back of the leakage, including any leakage through the outer container, then creates a vacuum in the space between the two containers to prevent any leakage through the outer container into the atmosphere. Therefore, any fission products escaping from the inner container are totally contained within the reactor plant enclosure. The compressor or compressors, desirably with independent power sources, can be located either within or external to the reactor plant enclosure.

Further objects and advantages of the invention will become apparent as the following description proceeds; and features of novelty, which characterize the invention, will be pointed out in particularity in the claims annexed to and forming a part of this specification.

For a better understanding of the invention, reference may be had to the accompanying drawings, in which:

FIGURE 1 is a vertical section of the pump-back arrangement and the reactor plant enclosure with certain parts being in elevation and taken substantially along reference line I—I of FIG. 2;

FIG. 4 is an enlarged fragmentary cross sectional view of an alternate scheme for the double liner construction shown in FIG. 1 and taken generally along that portion of the reference line II—II above the compressor of FIG. 1.

Figure 2:
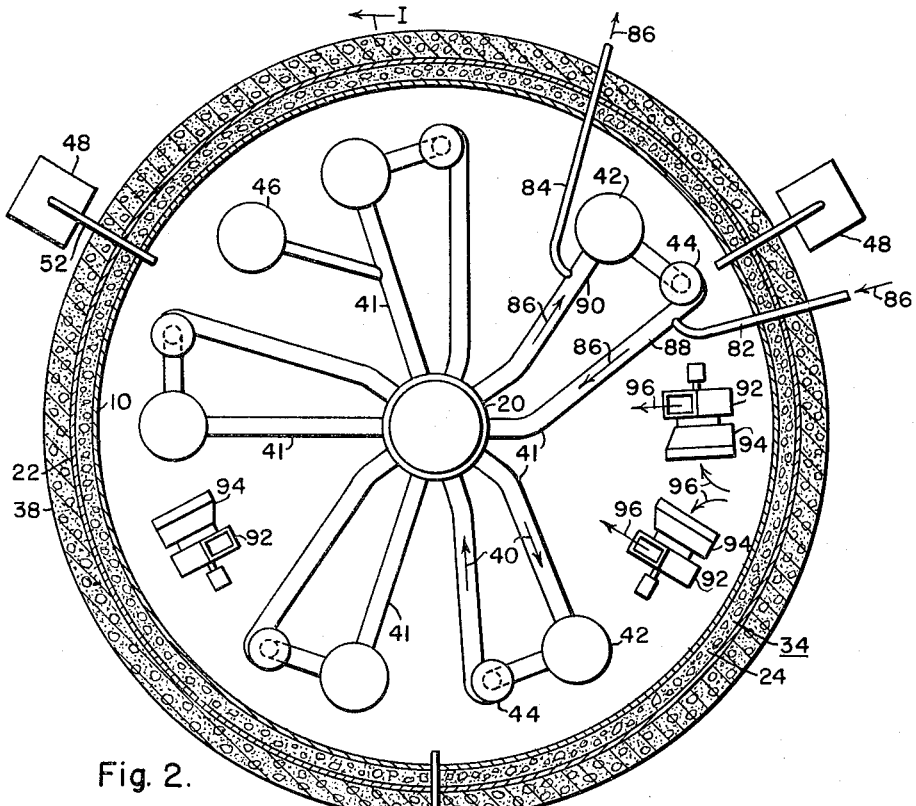
FIG. 2 is a cross sectional view of the pump-back arrangement and reactor plant enclosure taken along reference line II—II of FIG. 1.

Referring now to FIGS. 1 and 2 of the drawings, an illustrative example of a pump-back arrangement coupled to a reactor plant enclosure containing a nuclear power plant is depicted therein. An inner container or liner 10 comprises a hemispherical head portion 12, a cylindrical wall portion 14, a flat circular floor 16, and a cylindrically shaped downward extension 18 at the center of the floor 16 so as to receive the lower portion of a reactor 20. The inner container 10 is a substantially impervious membrane made from a material such as steel. In this example of a nuclear power plant the generating unit will produce approximately 1000 megawatts of electricity with the use of separately fired steam superheaters. The inner container 10, in this example, is fabricated of approximately ⅜ inch stainless steel or carbon steel plate, has an inside diameter of approximately 150 feet, and has an inside height of approximately 170 feet.

Surrounding and spaced outwardly from the inner container 10 is an outer container or liner 22, which forms an intermediate space 24 between the inner and outer containers 10 and 22 respectively. The material used for the outer container 22 is the same or similar to the material previously described for the inner container 10. In this example the width of the space 24 is approximately 2 feet, and the shape of the outer container parallels that of the inner container.

Extending downward and in line with the cylindrical wall 14 is a cylindrical screen or perforated plate 26, which permits the flow of the fluid therethrough but prevents the passage of gravel or crushed stone to be described hereinafter. The screen 26 is secured to the bottom of wall 14 and to a floor portion 30 of the outer container 22. Spaced inwardly from the screen 26 is another cylindrical screen or perforated plate 28, which is secured to the floor 16 and to the floor portion 30 so as to form an annular exhaust space or chamber 32. In this specification the term "annular" is not to be restricted to a member having inner and outer circular peripheries but is also intended to include a member with inner and outer peripheries having a configuration other than circular. The intermediate space 24, excepting for the exhaust space 32, is then substantially filled with particles such as gravel or crushed stone 34. A low density, pervious concrete can also be used in lieu of the gravel to fill the space 24. Concrete blocks 39 (FIG. 3) can also be used in place of the gravel between the floors 16 and 30. The concrete blocks would then support the floor 16 and provide air passages to permit the passage of a fluid between the floors 16 and 30.

Open structural bracing (not shown) can also be used between the inner container 10 and the outer container 22 in lieu of the gravel. Sufficient structural bracing is used to transmit the design internal pressure loading from the inner container 10 to the outer container 22. Since a fluid is capable of passing around structural bracing, the previously mentioned exhaust space 32 can then be eliminated. The reason for this is that the use of structural bracing will permit the free flow of a fluid therethrough and does not require an exhaust header to which a plurality of exhausting means can be coupled around the periphery of the exhaust header. The exhaust header 32 is normally used when the space 24 is filled with a material that offers some resistance to fluid flow.

The use of gravel or pervious concrete in the space 24 can also be eliminated by the use of a channel type or corrugated outer liner 23 (FIG. 4). In this case the corrugations or the inner portions 25 of the channel type liner would bear against the inner liner 10 so as to provide the means for transmitting the design internal pressure loading from the inner liner 10 to the corrugated outer liner 23.

Surrounding and bearing against the outer container 22 is a biological shield 36, which in this example is made of a normal density reinforced concrete having approximately a 6-foot thickness. The shield 36 provides the bulk of the shielding from internal direct radiation sources. The shield 36 also provides strength against a pressure buildup within the inner container 10 resulting from a serious accident to the reactor plant and shields the area outside of the shield 36 from direct radiation sources within the inner container 30.

From the foregoing it can be readily ascertained that a reactor plant enclosure 38 comprises in this example the inner container 10, the outer container 22, the concrete shield 36, and a pervious concrete or gravel 34 between the inner and outer containers 10 and 22 respectively. However, the reactor plant enclosure 38 can consist of an inner container 10 and an outer container 22 with only the intermediate space 24 therebetween except for the bottom portion of the space 24, which can be maintained by providing concrete blocks 39 (FIG. 3) or some type of structural steel support between the floor portions. In this case, however, the inner steel container or liner 10 must be made sufficiently thick to withstand the pressure buildup which can result from a serious accident to the reactor plant. Therefore, if the inner container 10 has sufficient thickness to withstand the aforementioned pressure buildup, the outer container 22 only requires sufficient thickness to permit the buildup of a slight negative pressure in the intermediate space 24.

On the other hand if the outer container 22 is of sufficient thickness to withstand a pressure buildup within the reactor enclosure, then some means such as pervious concrete must be provided in the space 24 to transmit the pressure buildup within the reactor plant enclosure 38 from the inner container 10 to the outer container 22. Therefore, if either container 10 or 22 has sufficient thickness to withstand the pressure buildup within the reactor plant enclosure resulting from a serious accident to the reactor plant, the biological shield 36 is not required for structural reasons but is only required as a means of shielding the area outside of the reactor plant enclosure 38 from radiation sources within the reactor plant enclosure 38.

The reactor plant enclosure 38 in this example contains five primary circulating loops 41, although a greater or lesser number of such loops can be employed as required. The five loops, as shown in FIG. 2, with their associated components and connected auxiliary systems comprise the primary coolant system of this nuclear plant. The primary fluid or coolant flow within a primary loop 41 is indicated by the flow arrows 40. In each of the five loops the flow is from the reactor 20 to a steam generator 42, from the steam generator 42 to a primary coolant pump 44, and from the primary coolant pump 44 back to the reactor 20. A pressurizer 46 (FIG. 2) is coupled to one of the loops in order to maintain a certain range of pressure within the primary system.

The intermediate space 24 is maintained under a pressure which is lower than the pressure within the inner container 10 or the pressure outside of the outer container 22. In this example, the pressure would be maintained slightly below atmospheric pressure so as to create a slight vacuum or negative pressure within the space 24. The negative pressure is maintained within the space 24 by some type of exhaust or fluid pumping means such as a compressor 48. The compressor 48 communicates with the exhaust header 32 by means of an inlet conduit 50. The inlet conduit 50 is secured to the screen 26 and passes through the gravel 34, through the outer container 22 and communicates with the inlet of the compressor 48. An outlet conduit 52 then communicably couples the discharge of the compressor 48 to the inner space 53 within the inner container 10. Therefore, each compressor system 54 comprises the inlet conduit 50, the compressor 48, and the outlet conduit 52. The outlet conduit 52 penetrates both the outer container 22 and the inner container 10 so as to be capable of discharging the fluid from the compressor 48 into the inner space 53. The conduits 50 and 52 are sealably secured to the containers 10 and 22 that the conduits penetrate in order to insure that there is no leakage at the penetration points of the conduits with the inner and outer containers.

The fluid flow through the compressor system 54 is indicated by the flow arrows 58. As shown in FIG. 1, the fluid flow is from the exhaust header 32, through the inlet conduit 50, through the compressor 48, through the outlet conduit 52, and into the space within the inner container 10.

In this example, the compressor 48 is located outside of the reactor plant enclosure 38. Two or three compressors 48 are dispersed around the periphery of the reactor plant enclosure 38. Separate controls and separate power sources are provided for each compressor 48 in order to insure reliability of operation. Each compressor 48 has sufficient capacity to maintain a vacuum in the intermediate space 24 without the aid of the remaining compressors 48. In this example each compressor 48 has a capacity of about 10 c.f.m. and can maintain a vacuum of approximately 10 inches of mercury against a discharge head of approximately 50 p.s.i.g. As such any leakage of fluid into the space 24 is pumped back into the inner space 53 within the inner container 10. As such no leakage can occur from the inner space 24 to the outside of the reactor plant enclosure 38 and, in turn, to the atmosphere.

It is also to be noted that the compressors 48 can be located within the inner container 10. Therefore, only one penetration (not shown) would be required through the inner container 10 by the inlet conduit 50 which couples the inlet of the compressor 48 to the exhaust space 32. The compressor 48 could then discharge directly into the space within the inner container 10 and would not require an outlet conduit 52.

Each compressor 48 and its associated equipment located outside of the reactor plant enclosure 38 is enclosed within a biological shield made of a material such as concrete. This is to protect any personnel from any radioactive material or fission products that may be pumped through the compressor system 54 from the intermediate space 24 into the inner space 53. The reliability of maintaining a vacuum or negative pressure within the space 24 is enhanced by including in the compressor design the following features:

(1) Three separate compressors 48 are provided with each one having a capability of maintaining the design value for the negative pressure in the intermediate space 24.

(2) Each compressor 48 is located outside of the reactor plant enclosure 38 to prevent damage which could otherwise occur from a nuclear incident within the reactor plant enclosure 38.

(3) Separate electrical circuits and controls are provided for each unit so as to prevent the dependency of one unit upon another.

Even if all of the compressors 48 were accidentally lost, it would require approximately several days for leakage into the intermediate space 24 to eliminate the negative pressure normally maintained within the aforementioned space 24 provided a negative pressure is maintained during operation of the nuclear plant. Therefore, the aforementioned period of time required to eliminate the slight vacuum within the space 24 would provide ample time to correct the cause of the outage.

Figure 3:
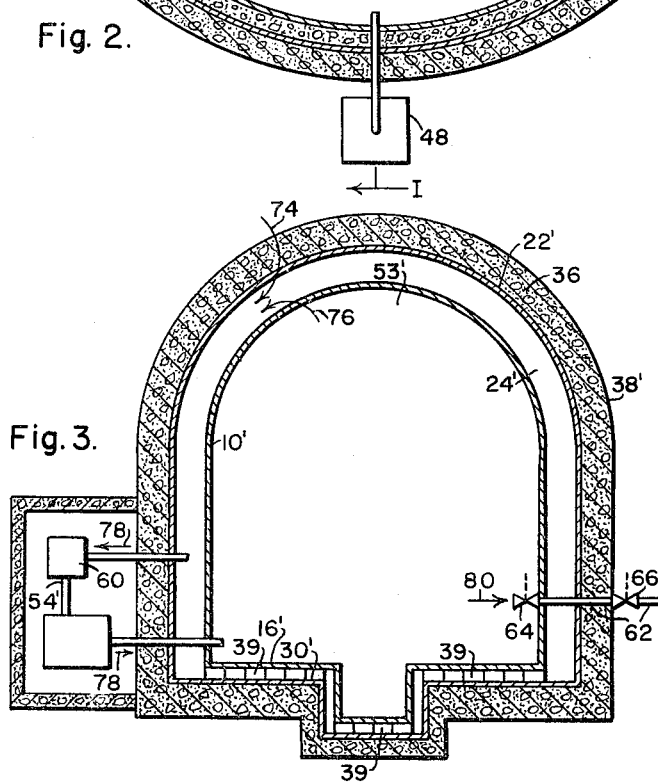
FIG. 3 is a vertical sectional view of another pump-back arrangement and reactor plant enclosure pursuant to the invention.

Referring now to FIG. 3, there is shown a simplified sectional view of an alternate pump back arrangement and a schematic of how the leakage prevention system operates. As previously described, a slight vacuum or negative pressure is maintained in the intermediate space 24' by pumping into the inner space 53' any leakage that occurs through containers 10' and 22'. The leakage is pumped by means of the compressor system 54', which is similar to the system 54 previously described in connection with FIG. 1. The compressor system 54' pumps the leakage from the intermediate space 24' into an inner space 53' within the inner container 10'. An airflow meter 60 within the compressor system 54' measures in the conventional manner the total leakage that has occurred into the space 24' through both the inner and outer liners 10' and 22' respectively.

Also installed through the reactor plant enclosure 38' is an outlet fluid or air flow conduit 62. The air flow conduit 62 is sealably secured to the inner and outer liners 10' and 22' respectively. Inside the inner liner 10' there is installed an inlet valve 64 on the air flow conduit 62. A stop valve 66 is also installed in the air flow conduit 62 but is located outside of the reactor plant enclosure 38'. Downstream of the stop valve 66 there is installed a fluid or airflow meter 68 in the air flow conduit 62; and downstream of the airflow meter 68 there is installed a fan 70, which discharges the fluid, withdrawn from within the inner liner 10, into a stack (not shown). A monitor (not shown) is located at the top of the stack so as to provide an indication if the fluid being discharged from the stack is too radioactive to be discharged into the atmosphere.

Under normal operating conditions, any pressure buildup within the inner liner 10', due to leakage through the outer liner 22', is periodically relieved to a standard value which is set above the highest atmospheric pressure anticipated. This relief is provided through the outlet air flow conduit 62 by having the fan 70 draw the fluid or air through the valves 64 and 66, through the airflow meter 68, and discharging the fluid into the stack (not shown). The radioactivity of the fluid can be diluted by controlling the amount of dilution air drawn into the conduit 62, as indicated by the flow arrow 73, through a valved conduit 72, which is communicably joined to conduit 62 downstream of airflow meter 68. After the standard value for the pressure within the inner container 10' is reached, a reading is taken from the airflow meter 68 in order to determine the amount of leakage through the outer liner 22' into the space 24'. By subtracting this reading from the total leakage determined from the reading taken from the airflow meter 60, the amount of leakage through the inner liner 10' can be determined. In determining the amount of leakage, corrections are made for the differences in pressure and temperature between the locations of the airflow meters 60 and 68 and the inner space 53'. Also the changes in temperature and humidity of the inner space 53' between the time of the readings and the beginning of the test period must be taken into account in determining the amount of leakage.

The two valves 64 and 66 are used in series in order to provide a double barrier with respect to the escape of any fluid within the space inside of the inner liner 10' to the atmosphere.

Also shown in FIG. 3 are concrete blocks 39, which are placed within the bottom horizontal portion of the intermediate space 24' so that the floor 16' is supported by the concrete blocks 39 which in turn are supported by the floor 30' which forms the lower part of the outer container 22'.

In brief, the operation of the invention is as follows. Leakage from the atmosphere through the outer liner 22' into the intermediate space 24' is indicated by flow arrow 74. Leakage from the inner space 53' through the inner liner 10' into the intermediate space 24 is indicated by flow arrow 76. The leakage into the space 24' is then pumped by the compressor system 54' from the intermediate space 24' into the inner space 53' within the inner liner 10' as indicated by flow arrows 78. It can therefore readily be seen that there can be no leakage from within the reactor plant enclosure 38' to the atmosphere outside. If the pressure within the inner liner builds up too much, this excess pressure can be relieved through the outlet air flow conduit 62 as previously described and as shown by the flow arrows 80. The valves 64 and 66 are normally kept closed unless the pressure within the inner liner 10' is to be reduced. If a reduction is desired, the valves 64 and 66 are opened and the pressure is relieved through the fan 70 into the stack (not shown) and is discharged to the atmosphere.

Referring now to FIG. 4, there is shown still another pump-back arrangement utilizing the corrugated liner 23. In this example, an inlet conduit 51 penetrates an outer portion 27 of the corrugated liner 23 so as to communicate with one of the spaces 29 as shown in FIG. 4. The fluid flow through the compressor circuit shown in FIG. 4 is indicated by flow arrows 55. Thus, the fluid flow is from space 29, through the inlet conduit 51, through the compressor 48, through the outlet conduit 52, and into the space within the inner container 10.

Fluid from all the spaces 29 will reach the inlet conduit 51, because the corrugation 25 fits loosely against the inner container 10 and thereby permits leakage to occur from one space 29 to another space 29 through the loose fit between the corrugation 25 and the inner container 10. Another method of collecting the fluid which leaks into the spaces 29 is by providing an exhaust space or header 32 similar to the one shown in FIG. 1, which communicates with both the inlet conduit 51 and all of the spaces 29.

Returning now to FIGS. 1 and 2 there are shown several methods of removing heat from within the inner container 10 which in turn prevent the pressure within the container 10 from increasing beyond a predetermined limit or which reduce the aforementioned pressure.

Each method to be described hereinafter is capable of preventing the aforementioned pressure rise or of reducing the pressure. The first method is by use of the decay heat removal system.

This system comprises an inlet line 82, an outlet line 84, and a heat exchanger (not shown). The heat exchanger, located outside of the reactor plant enclosure 38, has cooling water flowing through it on the shell side and primary coolant flowing through it on the tube side. The flow circuit for the primary coolant is indicated by flow arrows 86. The primary coolant flows from the heat exchanger (not shown), through inlet conduit 82, through the primary inlet conduit 88, and through the reactor 20 where the decay heat from the core is absorbed by the primary coolant. The heated primary coolant then flows out of the reactor 20, through the primary outlet conduit 90, through the outlet conduit 84, and through the heat exchanger where the heat is removed from the primary coolant by the cooling water flowing through the shell side of the exchanger. Pumps (not shown) are provided in the outlet portion 84 of the decay heat removal system to pump the primary coolant through the aforementioned flow path.

Another method to remove heat from within the container 10 is by recirculating the fluid or air within container 10 through cooling coils thereby cooling the air. In this example there are four fans 92, of which three are shown in FIG. 2. Each fan 92 discharges into a duct (not shown) which distributes the air throughout the inner container 10. The air then returns to the inlet of fan 92 through a cooling coil 94 located on the inlet side of fan 92. The air flow path is indicated by flow arrows 96. Inlet and outlet cooling water conduits (not shown) communicate with the cooling coils 94 and provide the necessary cooling water to the cooling coils 94 to cool the air passing through the cooling coils.

While there have been shown and described what are at present considered to be the preferred embodiments of the invention, modifications thereto will readily occur to those skilled in the art. It is not desired, therefore, that the invention be limited to the specific arrangements shown and described. However, it is intended to cover in the appended claims all such modifications as fall within the true spirit and scope of the invention.

I claim as my invention:

1. A nuclear reactor containment system comprising a sealed inner container completely enclosing a reactor vessel and related components for supplying a pressurized coolant to said vessel, a sealed outer container completely surrounding and spaced outwardly of said inner container, pervious force transmitting means in the space between said inner container and said outer container for transmitting forces from the inner container to the outer container, cooling and recirculating means within the inner container disparate from said reactor vessel and related coolant supplying components for reducing the temperature and pressure of a fluid within said inner container, said fluid including any pressurized coolant escaping from said reactor vessel and related coolant supplying components, and means for maintaining a pressure in the space between said containers lower than the pressure within said inner container and lower than the pressure outside of said outer container by conveying from said space to said inner container any fluid which leaks into said space.

2. The combination of claim 1 wherein compressing means are used to maintain said lower pressure in the space between said containers continuously during reactor operation and including means for determining said fluid leakage through said inner container and through said outer container.

References Cited by the Examiner

UNITED STATES PATENTS

| | | | |
|---|---|---|---|
| 761,548 | 5/1904 | Sheaff | 220—14 |
| 1,381,175 | 6/1921 | Ericsson | 220—63 |
| 2,396,459 | 3/1946 | Dana | 62—45 |
| 2,773,459 | 12/1956 | Sechy. | |
| 2,853,624 | 9/1958 | Wigner et al. | |
| 3,008,889 | 11/1961 | Junkins. | |
| 3,056,736 | 10/1962 | Went et al. | |
| 3,115,450 | 12/1963 | Schanz. | |

FOREIGN PATENTS 897,388   5/1962   Great Britain.

OTHER REFERENCES

Brown et al.: German application, 1,109,278, printed June 22, 1961 (KL. 21g 21/32).

LEON D. ROSDOL, *Primary Examiner.*

REUBEN EPSTEIN, CARL D. QUARFORTH,
*Examiners.*

L. DEWAYNE RUTLEDGE, J. V. MAY,
*Assistant Examiners.*